(12) United States Patent
Yu et al.

(10) Patent No.: US 12,724,484 B2
(45) Date of Patent: Sep. 1, 2026

(54) SELF-POWERED PASSIVE ELECTRO-TACTILE HAPTIC GLOVE

(71) Applicant: City University of Hong Kong, Hong Kong (HK)

(72) Inventors: Xinge Yu, Hong Kong (HK); Guoqiang Xu, Hong Kong (HK); Haoyu Wang, Hong Kong (HK); Guangyao Zhao, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 19/295,694

(22) Filed: Aug. 11, 2025

(65) Prior Publication Data

US 2026/0050326 A1 Feb. 19, 2026

Related U.S. Application Data

(60) Provisional application No. 63/682,773, filed on Aug. 13, 2024.

(51) Int. Cl.
*G06F 3/01* (2006.01)
*H02N 1/04* (2006.01)

(52) U.S. Cl.
CPC .............. *G06F 3/014* (2013.01); *G06F 3/016* (2013.01); *H02N 1/04* (2013.01)

(58) Field of Classification Search
None
See application file for complete search history.

(56) References Cited

U.S. PATENT DOCUMENTS

2021/0404844 A1* 12/2021 Lee .......................... G01D 5/14
2023/0020111 A1* 1/2023 Zhu .......................... G06F 3/014
(Continued)

FOREIGN PATENT DOCUMENTS

CN 110764621 A * 2/2020 ............... G06F 3/16
CN 120222799 A * 6/2025 ............... H02J 7/02
(Continued)

OTHER PUBLICATIONS

Guoqiang Xu et al., "Self-powered electrotactile textile haptic glove for enhanced human-machine interface," Science Advances, 2025, vol. 11 (12), p. 1-10.

*Primary Examiner* — Kenneth Bukowski
(74) *Attorney, Agent, or Firm* — Idea Intellectual Limited; Sam T. Yip

(57) ABSTRACT

The present invention provides a self-powered passive electro-tactile haptic glove comprising: a plurality of textile-based triboelectric nanogenerators (TENGs) configured to harvest electrostatic energy through physical contact; a plurality of power management circuits electrically connected to the plurality of TENGs respectively and configured to covert the electrostatic energy harvested by the plurality of TENGs into electro-stimulation signals; and a plurality of skin stimulation electrode pairs electrically connected to the plurality of gas discharging tube-based power management circuits respectively and configured to transfer the electro-stimulation signals from the plurality of power management circuits to a user's skin. The provided glove is light-weight, self-sustainable and cost-effective, therefore has potential in fields of AR/VR, recovery treatment, and mutual perception systems between robots and humans.

10 Claims, 22 Drawing Sheets

(56) References Cited

U.S. PATENT DOCUMENTS

| | | | | |
|---|---|---|---|---|
| 2023/0409114 | A1* | 12/2023 | Sun | G06F 3/017 |
| 2024/0156193 | A1* | 5/2024 | Rosselli | B32B 5/06 |
| 2025/0143596 | A1* | 5/2025 | Chen | A61B 5/1102 |

FOREIGN PATENT DOCUMENTS

| | | | | |
|---|---|---|---|---|
| KR | 101821048 | B1 * | 1/2018 | G06F 3/014 |
| WO | WO-2024179676 | A1 * | 9/2024 | A43B 3/48 |

* cited by examiner

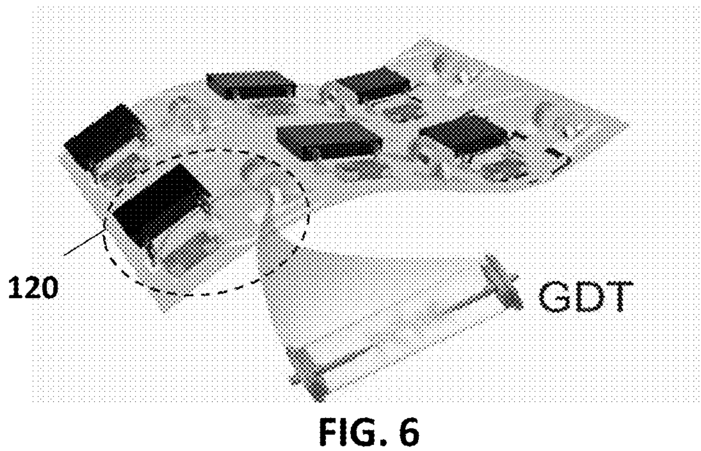
FIG. 6
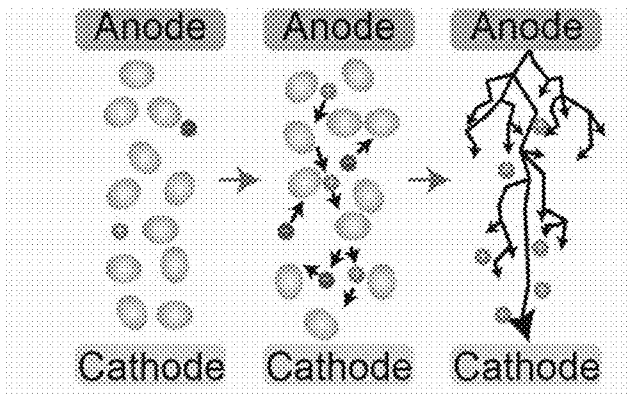
FIG. 7
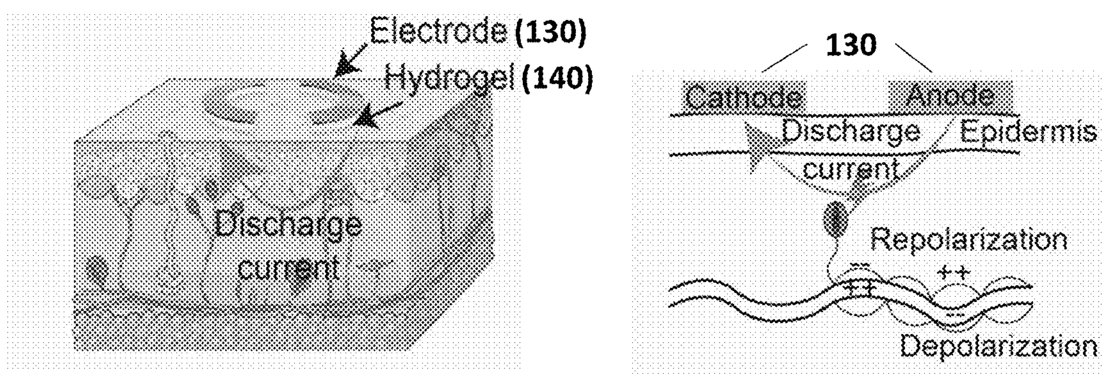
FIG. 8
FIG. 9

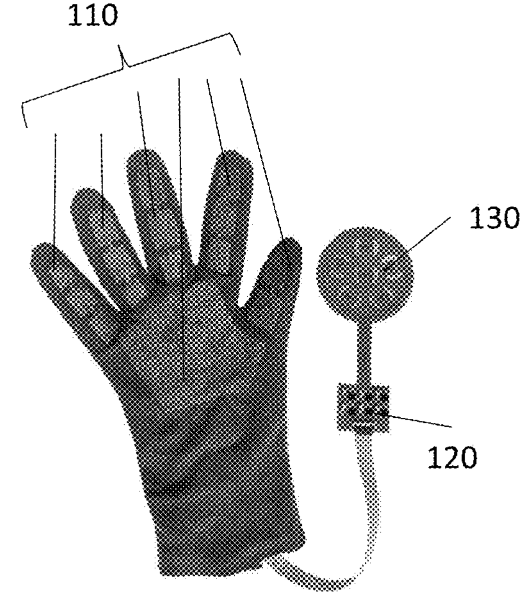
FIG. 10
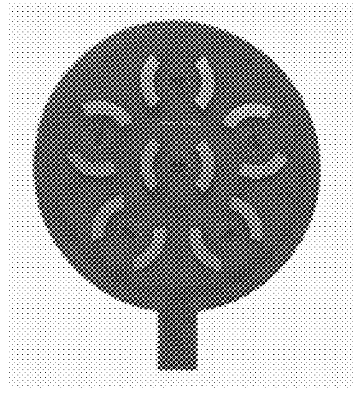
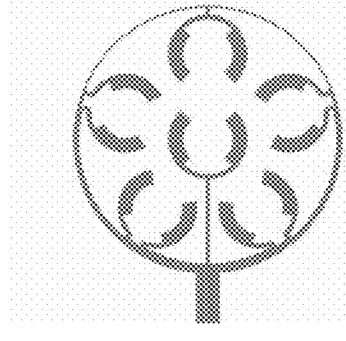
FIG. 11A
FIG. 11B

| | T | I | M | R | L | P | Accuracy (%) |
|---|---|---|---|---|---|---|---|
| Thumb | 25 | 0 | 0 | 0 | 0 | 0 | 100 |
| Index | 0 | 25 | 0 | 0 | 0 | 0 | 100 |
| Middle | 0 | 0 | 25 | 0 | 0 | 0 | 100 |
| Ring | 0 | 0 | 0 | 25 | 0 | 0 | 100 |
| Little | 0 | 0 | 0 | 1 | 24 | 0 | 96 |
| Palm | 0 | 0 | 0 | 0 | 0 | 25 | 100 |

SELF-POWERED PASSIVE ELECTRO-TACTILE HAPTIC GLOVE

CROSS-REFERENCE TO RELATED APPLICATIONS

The present application claims priority from the U.S. Provisional Patent Application No. 63/682,773 filed on 13 Aug. 2024, and the disclosure of which is incorporated herein by reference in its entirety.

FIELD OF THE INVENTION

The present invention generally relates to electro-tactile sensing technology. More specifically the present invention relates to a self-powered passive electro-tactile haptic glove.

BACKGROUND OF THE INVENTION

Currently, the tactile sensation is commonly achieved through mechanical and electrical stimulation. The mechanical stimulation devices, such as pneumatic actuators, linear motor, and shape memory alloy, directly provide a mechanical stimulus to the mechanoreceptors in the skin, thus achieving this perception. These devices usually require numerous additional accessories and cables for power transmission and connectivity, resulting in heavyweight and large size. Besides, the challenges stemming from heat generation, high working voltage, and high costs present obstacles in achieving large-sized wearable tactile sensation in some of other mechanical haptic interface, like piezoelectric, dielectric elastomers, and electromagnetic-based haptic interface. Unlike cumbersome mechanical devices, electrical tactile stimulation devices rely on providing direct/alternating current to the skin receptors by utilizing the small-size electrodes patterns, enabling high-resolution stimulation. Therefore, they are deemed more appropriate forms of tactile stimulation for wearable devices. However, they encounter the obstacle of high working voltages, which may result in associated discomfort and safety concerns over prolonged use.

SUMMARY OF THE INVENTION

To address the abovesaid shortcomings, the present invention provides a self-powered passive electro-tactile haptic (SPETH) glove for applications of electrical stimulation treatment, prosthesis tactile sensation interface, and virtual reality.

In one aspect of the present invention, the self-powered passive electro-tactile haptic glove comprises: a plurality of textile-based triboelectric nanogenerators configured to harvest electrostatic energy through physical contact; a plurality of power management circuits electrically connected to the plurality of textile-based triboelectric nanogenerators respectively and configured to covert the harvested electrostatic energy harvested by the plurality of triboelectric nanogenerators into electro-stimulation signals; and a plurality of skin stimulation electrode pairs electrically connected to the plurality of power management circuits respectively and configured to transfer the electro-stimulation signals from the plurality of power management circuits to a user's skin.

Preferably, each of the textile-based triboelectric nanogenerators has a layered structure including: a first triboelectric electrode layer embroidered with electrically conductive wires; a second triboelectric electrode layer embroidered with electrically conductive wires; and a dielectric film sandwiched between the first and second triboelectric electrode layers.

Preferably, wherein the dielectric film is a fluorinated ethylene propylene (FEP) film, a polytetrafluoroethylene (PTFE) film or a polyvinylidene fluoride (PVDF) film.

Preferably, the electrically conductive wires are silver wires or copper wires.

Preferably, the power management circuit includes: a capacitor configured to build up an electric filed to store the harvested energy; and a gas discharge tube connected to the capacitor and configured to facilitate conduction of a discharge current acting as the electro-stimulation signal when a voltage across the capacitor reaches a breakdown threshold.

Preferably, each of the textile-based triboelectric nanogenerators is further configured to output the harvested energy as an alternating current; and each of the power management circuits further includes a rectifier configured to rectify the corresponding alternating current to a direct current.

Preferably, the self-powered passive electro-tactile haptic glove further comprises a skin electro-stimulation patch including a flexible print circuit board for accommodating the plurality of skin stimulation electrode pairs.

Preferably, each of the skin stimulation electrode pair includes: a first skin-contact electrode connecting a first output terminal of the power management circuit to a first contact point on the skin; and a second skin-contact electrode connecting a second output terminal of the power management circuit to a second contact point on the skin.

Preferably, each of the first and second skin-contact electrode has a semi-circular shape.

Preferably, each of the first and second skin-contact electrodes is overlayed with a hydrogel film for enhancing contact with the skin and decreasing impedance of skin.

Through the SPETH glove, mechanical energy resulting from finger or hand movements is efficiently converted into electro-stimulation for haptic feedback at the designated position of the hydrogel electrodes. These electrodes can be positioned on various locations of the human body to induce specific tactile sensations.

Considered an end-to-end solution, the SPETH glove can combine with robots, prosthesis, and VR/AR device to achieve a phantom limb sensation and passive haptic feedback system without restrictions on power supply and connectivity cables. Moreover, it offers significant benefits over existing models, including being self-powered, lightweight, and cost-effective, showing potential in fields of AR/VR, recovery treatment, and mutual perception systems between robots and humans.

The SPETH glove provided by the present invention presents several significant advantages over existing technologies, including: (1) Self-Powered and Efficient: The SPETH glove harnesses the triboelectric effect and gas breakdown discharge to provide precise electrical stimulation for tactile sensations. It showcases exceptional efficiency, requiring minimal energy for delivering tactile feedback. (2) Portability and Affordability: The SPETH glove is characterized by self-sustainability, portability, and cost-effectiveness, making it a practical option for various applications. (3) Wearable Design: Unlike cumbersome mechanical devices, the SPETH glove offers a more streamlined and lightweight design, ideal for integration with prosthetic devices and human-machine interfaces. (4) Passive Interaction: The SPETH glove operates as a passive tactile feedback system, seamlessly integrating sensory perception and feedback in a single device. This integration of sensing and feedback enhances user experience by creating a cohesive and intuitive interaction loop.

BRIEF DESCRIPTION OF THE DRAWINGS

Embodiments of the invention are described in more details hereinafter with reference to the drawings, in which:

FIG. 6 shows schematic diagram of the plurality of power management circuits;

FIG. 7 shows working mechanism of a gas discharging tube (GDT) in the power management circuit;

FIG. 8 illustrates how the semi-circular electro-stimulation electrodes of the SPETH glove are used for tactile feedback;

FIG. 9 shows the principle behind the generation of haptic sensations by the SPETH glove;

FIG. 10 depicts a comprehensive optical image of a protype of the SPETH glove;

FIG. 11A shows an enlarged view of an electro-stimulation patch; and FIG. 11B shows an exemplary configuration of electro-stimulation electrodes;

FIG. 18A shows the basic setup; FIGS. 18B and 18C respectively portray two application demonstrations of the SPETH glove in a black box setting;

DETAILED DESCRIPTION

In the following description, details of the present invention are set forth as preferred embodiments. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
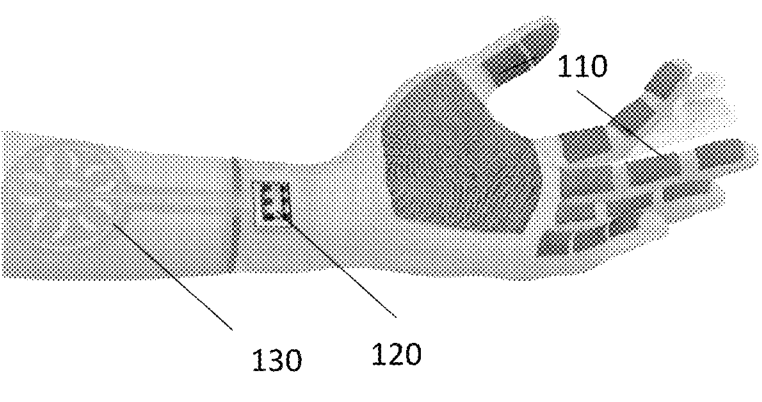
FIG. 1 shows a schematic diagram of a self-powered passive electro-tactile haptic (SPETH) glove in accordance with one embodiment of the present invention.

FIG. 1 shows a schematic diagram of a self-powered passive electro-tactile haptic (SPETH) glove in accordance with one embodiment of the present invention. The SPETH glove has a plurality of textile-based triboelectric nanogenerators (TENGs) 110 positioned on glove fingers and/or palm of a user and configured to harvest electrostatic energy through physical contact; a plurality of power management circuits 120 electrically connected to the plurality of TENGs respectively, and configured to covert the harvested electrostatic energy harvested by the plurality of TENGs into electro-stimulation signals; and a plurality of pairs of skin stimulation electrodes 130 electrically connected to the plurality of power management circuits 120 respectively and configured to transfer the electro-stimulation signals from the plurality of power management circuits 120 to the user's skin.

Figures 2A, 2B:
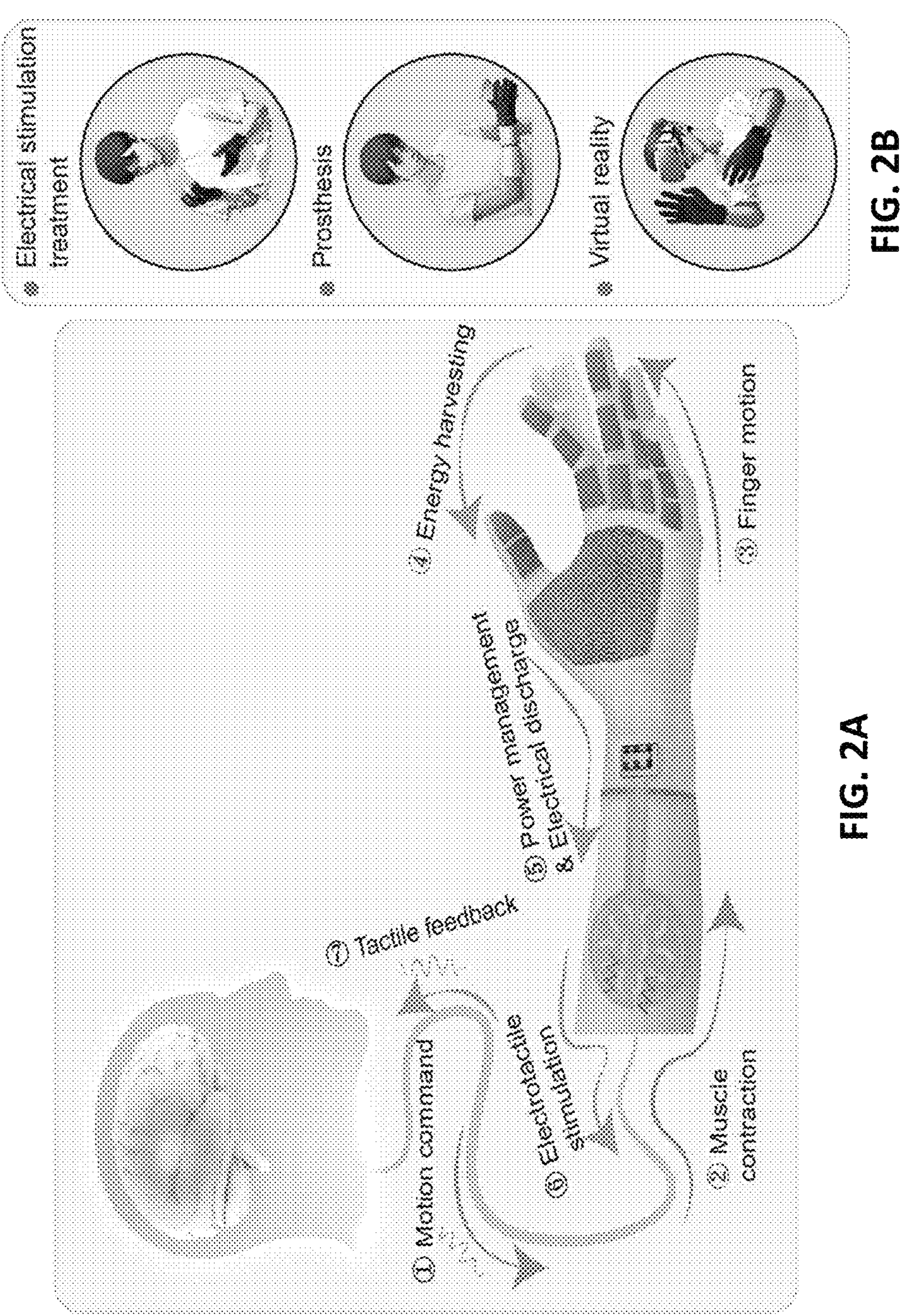
FIG. 2A illustrates operational mechanism of the SPETH glove.
FIG. 2B shows envisioned applications based on the SPETH glove.

FIG. 2A illustrates operational mechanism of the SPETH glove. When considering a daily physical activity, the brain of human initiates a motion command, result in muscle contraction and ensuing finger movements. Subsequently, the SPETH glove, donned upon the hand, collecting electrostatic energy through physical contact with objects, storing this harvested energy within the power management circuit. Once the energy accrues to a critical threshold, a breakdown discharge happens within the management circuit. This discharge process directs a discharge current into the skin through meticulously positioned electrodes, which then stimulates the sensory receptors in the skin and elicits neural excitation. Afterward, this excitation propagates through the peripheral nerves and ultimately reaches the brain, where it is assimilated as tactile feedback, completing the sensory loop in a coherent and responsive manner.

Besides, the trigger motion can not only be given by human motion but also by kinds of mechanical motion from robotic hands, prosthetics, and the like. Such interaction effectively bridges the gap between humans and diverse mechanical interfaces, establishing a self-powered bidirectional sensing and feedback system between them. Its envisioned utility spans a diverse spectrum of applications including electro-stimulation therapy, advanced prosthetic feedback mechanisms, and cutting-edge AR experiences, as visually evidenced in FIG. 2B.

Each of the TENGs 110 is characterized by three layers: a first triboelectric electrode layer embroidered with electrically conductive wires; a second triboelectric electrode layer embroidered with electrically conductive wires; and a dielectric film sandwiched between and electrically connected the first and second triboelectric electrode layers and configured to harvest the electrostatic energy through physical contact.

The conductive wire may be made of any suitable types of electrically conductive materials, such as, but not limited to, silver or copper. The dielectric film may be made of any suitable types of electrically conductive materials, such as, but not limited to, fluorinated ethylene propylene (FEP), a polytetrafluoroethylene (PTFE) film or a polyvinylidene fluoride (PVDF) film.

Figure 3:
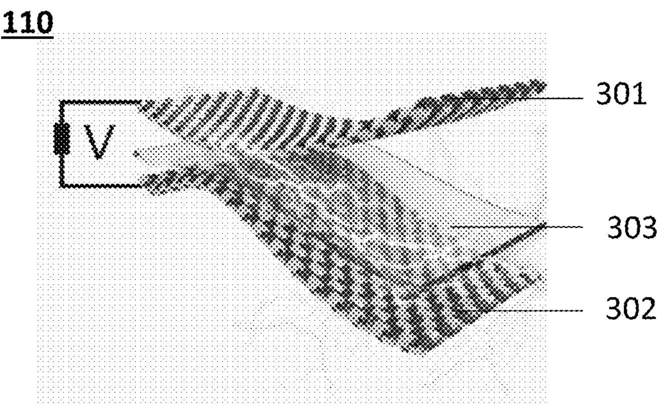
FIG. 3 shows architecture of a textile-based triboelectric nanogenerator (TENG) in accordance with one embodiment of the present invention.
Figure 4:
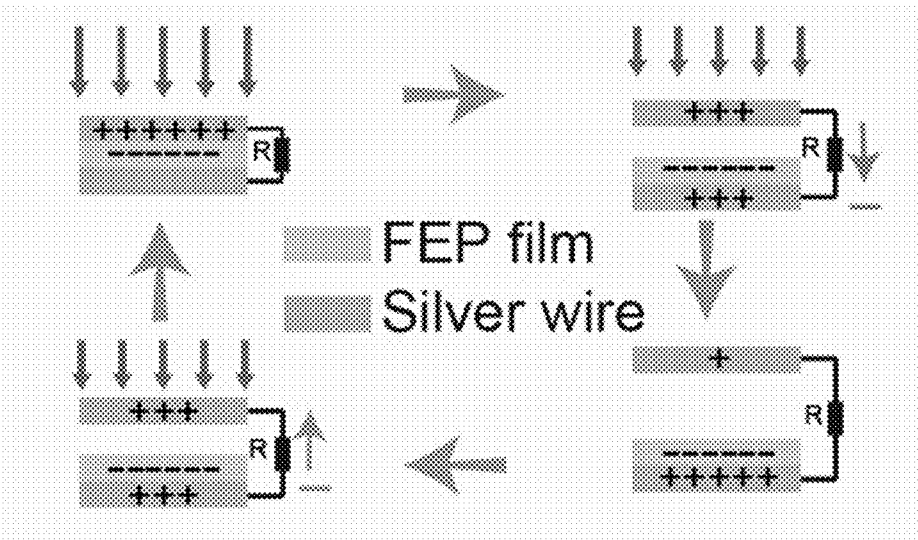
FIG. 4 shows the working principle of triboelectrification and electrostatic induction in the TENG.

FIG. 3 shows architecture of a TENG 110 in accordance with one embodiment of the present invention. As shown, the top electrode (first triboelectric electrode) 301 is crafted with conductive silver wires intricately embroidered onto the fabric, while the bottom electrode (second triboelectric electrode) 302 entails affixing a FEP film (dielectric film) 303 to the conductive silver wires on the fabric. FIG. 4 shows the working principle of triboelectrification and electrostatic induction. An alternating high-voltage output generated in the compressed and released process of the glove.

A notable aspect is the technology of seamlessly embedding silver wires into textile materials, effectively merging the traditional craft of embroidery with contemporary electronic functionality. This integration not only simplifies the manufacturing process and enhances aesthetics but also improves the overall efficiency and reliability of the TENG unit.

Leveraging advantages of embroidery technology allows for the creation of intricate and precise patterns, and flexibility and lightweight characteristics suitable for wearable devices. The resulting textile-based triboelectric unit exhibits excellent triboelectric performance, making it an ideal choice for self-powered wearable electronic devices and sensor applications.

Figure 5A:
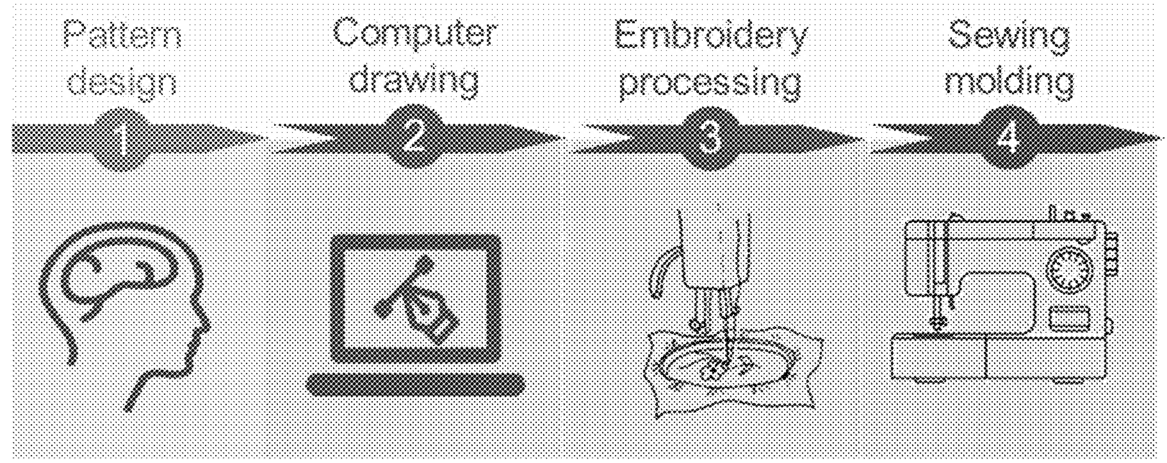
FIG. 5A depicts a flowchart of manufacturing process for the TENG.
Figure 5B:
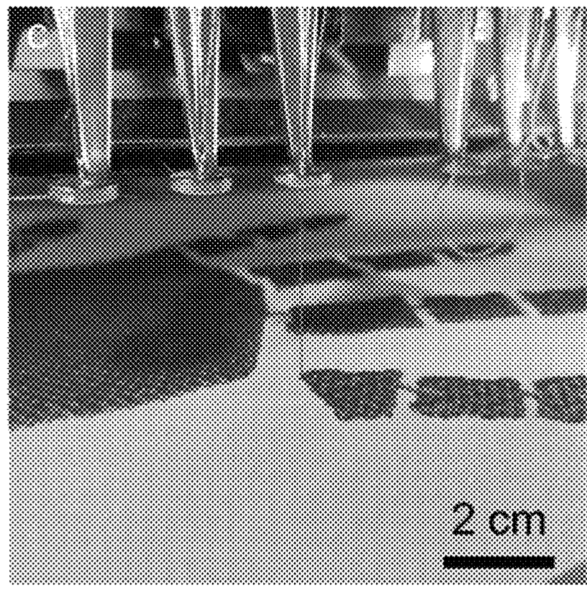
FIG. 5B shows an enlarge image of the embroidery part with specific conductive patterns through embroidery processing by an automatic embroidery machine.

FIG. 5A depicts a flowchart of manufacturing process for the TENG. The manufacturing process includes: 1) pattern design; 2) computer drawing; 3) embroidery processing; and 4) sewing molding. FIG. 5B shows an enlarge image of the embroidery part with specific conductive patterns through embroidery processing by an automatic embroidery machine.

FIG. 6 shows schematic diagram of the plurality of power management circuits 120, which are used for effective energy management and ensuring the device's safety. Each of the power management circuits 120 includes an energy storing capacitor (not shown) configured to store energy harvested by the textile-based triboelectric unit 111; and a gas discharging tube (GDT) configured to trigger a discharge current when the voltage of the capacitor reaches a breakdown threshold.

Preferably, the energy storing capacitor has a capacitance in a range of 0.1 nF-10 nF and the GDT has activation threshold in a range of 70V-250V to achieve effective, safe and comfort tactile perception.

FIG. 7 shows working mechanism of the GDT. When the voltage within the capacitor exceeds the activation threshold of GDT, an avalanche breakdown discharge is initiated within the GDT. This discharge process begins with the initial ionization of the encapsulated gas molecules induced by the strong electric field. Each collision can cause additional ionization events, resulting in a rapid increase in the number of free charge carriers (ions and electrons). These successive ionizations create an avalanche effect, leading to the formation of a conductive channel across the gas. As a result, a marked pulse current is generated, capable of delivering a tangible stimulus.

Lastly, as shown in FIG. 8, the semi-circular electro-stimulation electrodes 130 are used for tactile feedback. Preferably, a layer of conductive hydrogel 140, with thickness within 1 to 2 mm, is overlayed between the electrodes and skin to enhance contact with the skin and decrease impedance. The conductive hydrogel layer may be made of any suitable types of hydrogel materials, such as, but not limited to, PAAM ionic conductive hydrogel, polyethylene glycol (PEG) hydrogels, polyvinyl alcohol (PVA) hydrogels, and gelatin hydrogels.

In one embodiment, the fabrication process of PAAM ionic conductive hydrogel is provided as follows. Initially, an 8 M LiCl solution, 2 M Acrylamide (AAm), and PAAm (with a weight ratio of PAAm:AAm of 0.142) were dissolved in deionized water at 60° C. for 3 hours. Then, the crosslinker N,N'-methylenebisacrylamide (MBAA) was added at a concentration of 0.6 wt % of AAm, along with the photoinitiator Irgacure 1173 at a concentration of 1.6 wt % of AAm. The mixture was stirred overnight. Afterwards, the gel was poured into a mold and exposed to ultraviolet light for 30 minutes to ensure complete crosslinking of the hydrogel. Finally, the resulting hydrogel, with a thickness of 2 mm, was meticulously attached to the electrode for electro-stimulation purposes.

FIG. 9 shows the principle behind the generation of haptic sensations, ensuring a direct and intuitive interaction between the SPETH glove and its users. In addition, these components work in concert to fashion a self-sustaining system that not only simulates haptic sensations but does so in a self-powered passive manner, where no additional battery or external cables are needed. Specifically, when the SPETH glove administers electrical currents to localized skin areas, it triggers nearby mechanoreceptors' axons to generate action potentials following established neural pathways. These signals are subsequently transmitted to the somatosensory cortex, where the brain interprets them as tactile sensations. In essence, these integrated features converge to establish an environmentally conscious and innovative approach to simulating haptic feedback, marking a substantial advancement in haptic technology due to the device's passive operation that obviates the need for external energy sources.

FIG. 10 depicts a comprehensive optical image of a protype of the SPETH glove, crafted through an embroidery technique on fabric. FIG. 11A shows an enlarged view of an electro-stimulation patch made of a flexible printed circuit board (FPCB) and multiple pairs of electro-stimulation electrodes deposited on the FPCB. FIG. 11B shows an exemplary configuration of electro-stimulation electrodes.

Figure 12:
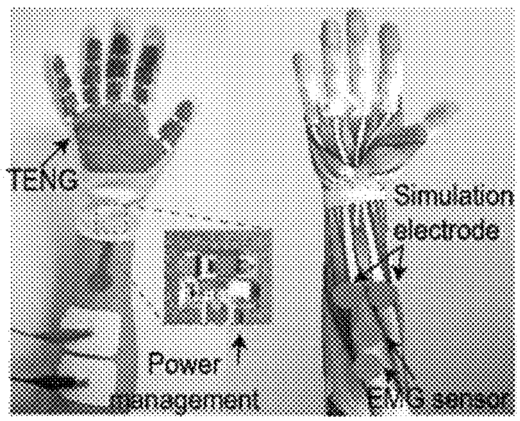
FIG. 12 depicts an electromyography (EMG) sensing system implemented with the SPETH glove.

In one embodiment, the discharge current induced by the SPETH glove can also be applied in self-powered electro-stimulation therapy. FIG. 12 depicts an electromyography (EMG) sensing system implemented with the SPETH glove.

Figure 13:
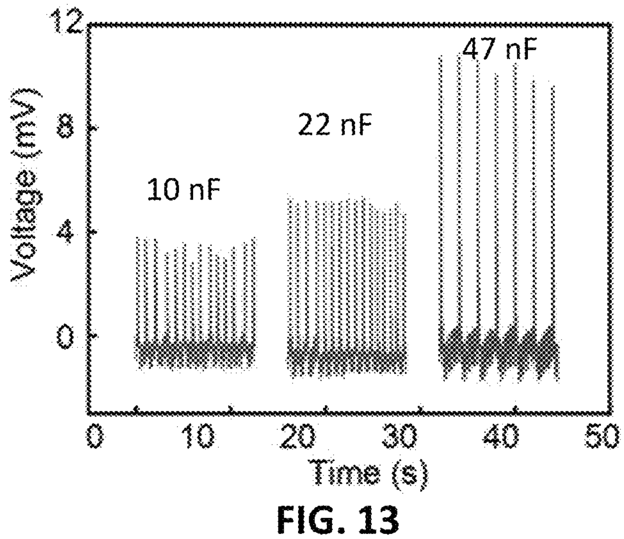
FIG. 13 shows different EMG signal was measured with different capacitance.
Figure 14:
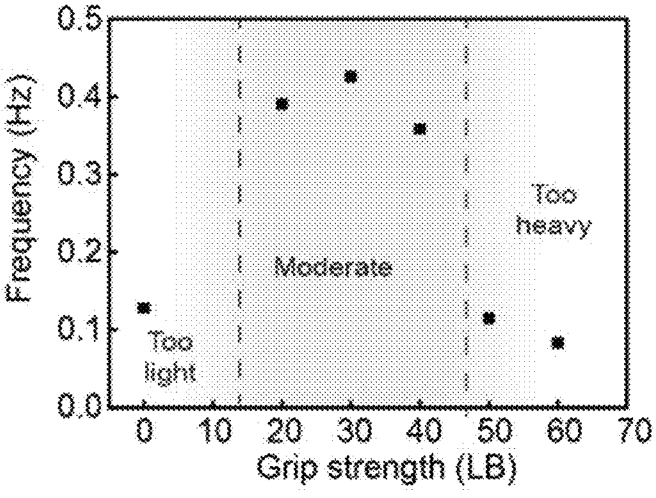
FIG. 14 illustrates how the discharge frequency of electrical stimulation in the SPETH glove varies under different grip strengths at a frequency of 1 Hz.

FIG. 13 shows different EMG signal was measured with different capacitance. Moreover, FIG. 14 illustrates how the discharge frequency of electrical stimulation in the SPETH glove varies under different grip strengths at a frequency of 1 Hz, thus showcasing the utility and applicability range of electrical stimulation therapy.

Performance Demonstration and Evaluation

Figure 15:
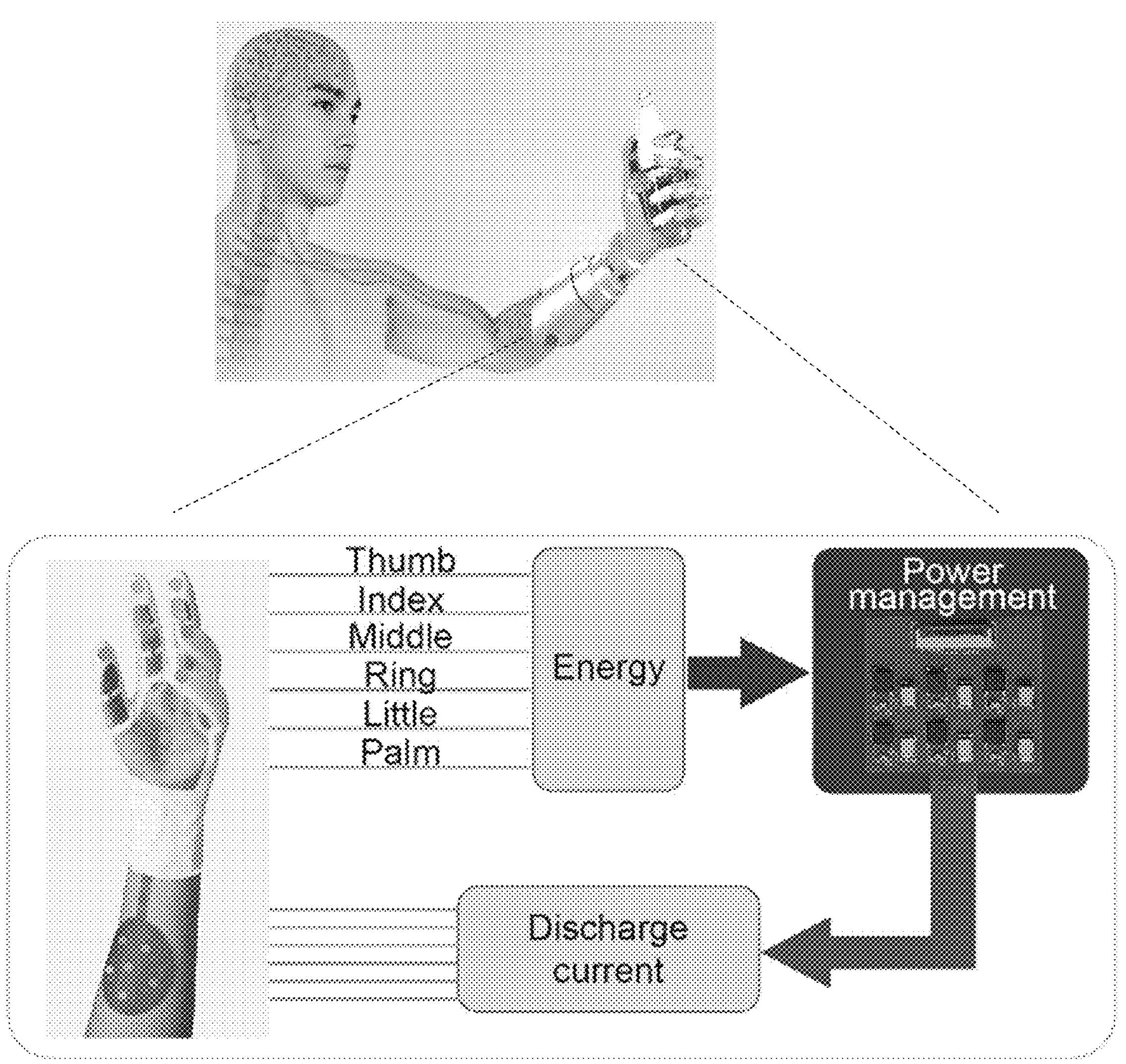
FIG. 15 shows a SPETH haptic glove for limb sensory feedback demonstration.

As shown in FIG. 15, a SPETH haptic glove including six TENG sets positioned at the fingers and palm of the glove is put on a hand for limb sensory feedback demonstration. Contact between the hand and an intended target generates electrically stimulating haptic feedback back to the user's arm. The discharge current triggered by the GDT then delivers targeted stimuli, enabling precise sensory perception and feedback.

Figures 16, 17:
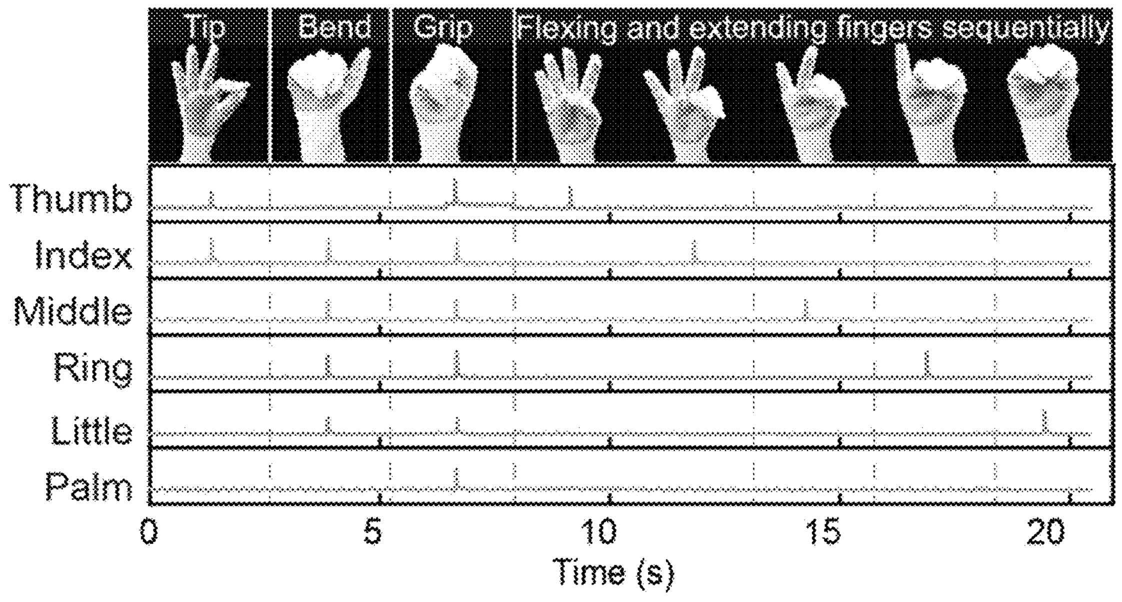
FIG. 16 illustrates pulse current diagrams of different electro-stimulation signal patterns corresponding to various finger movements.
FIG. 17 shows a confusion matrix depicting stimulation across different hand regions.

To demonstrate the generated current more intuitively, the electrode positions are indicated with LEDs respectively. Additionally, different electro-stimulation signal patterns are testing during various finger movements, encompassing operations like pinch with the thumb and index finger and the sequential opening and closing of four fingers, illustrated by pulse current diagrams in FIG. 16, demonstrating the glove's capability to provide fundamental action feedback. A confusion matrix depicting stimulation across different hand regions is presented in FIG. 17, where three subjects discriminated between stimulated glove locations successfully, showcasing precise spatial distinction.

Figure 18A:
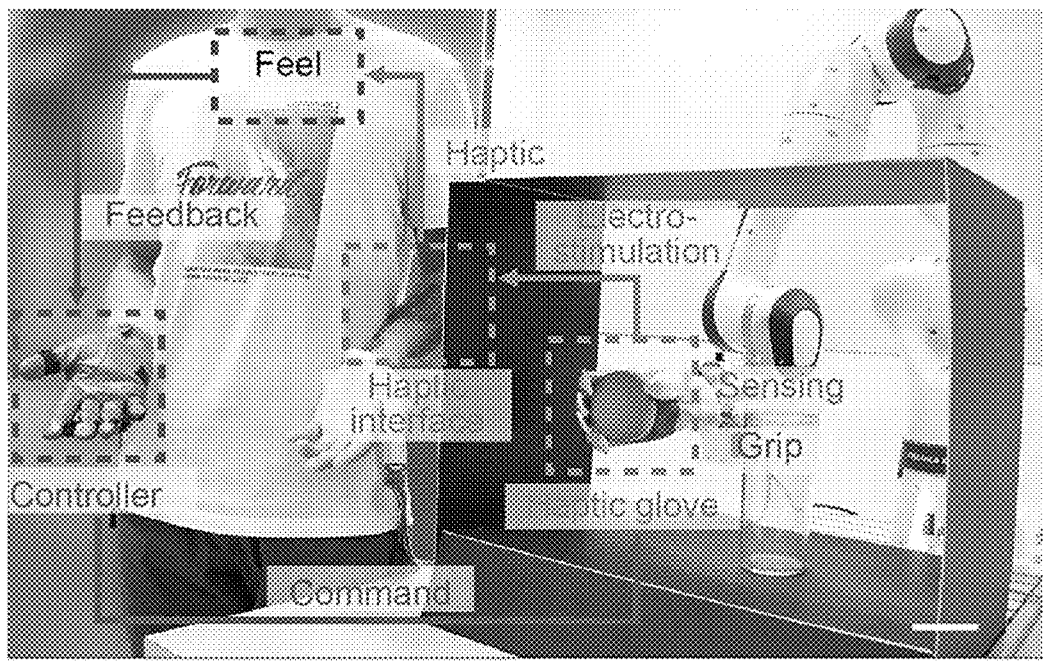
FIGS. 18A to 18C demonstrate a showcase of the potential application of the SPETH glove in prosthetics.

The SPETH glove showcases the potential application of the self-powered passive tactile feedback glove in prosthetics. As shown in FIG. 18A, the SPETH glove is worn on a robotic hand, with its electrodes positioned on the subject's right arm to deliver touch feedback. Detecting the arm's stimulation signals allows the wearer to initiate grasping commands through the left-hand control glove, enabling the robotic arm to autonomously grasp objects. This demonstration underscores how the SPETH glove enhances sensory perception for amputees or individuals experiencing tactile degradation.

Figure 18B:
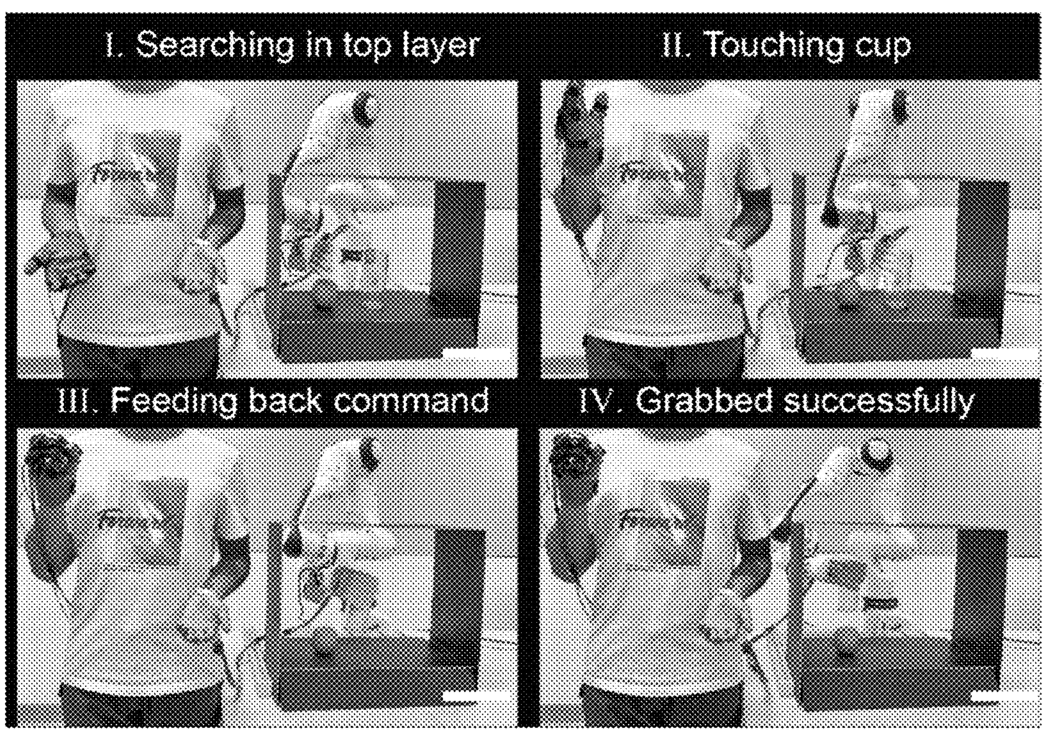
Figure 18C:
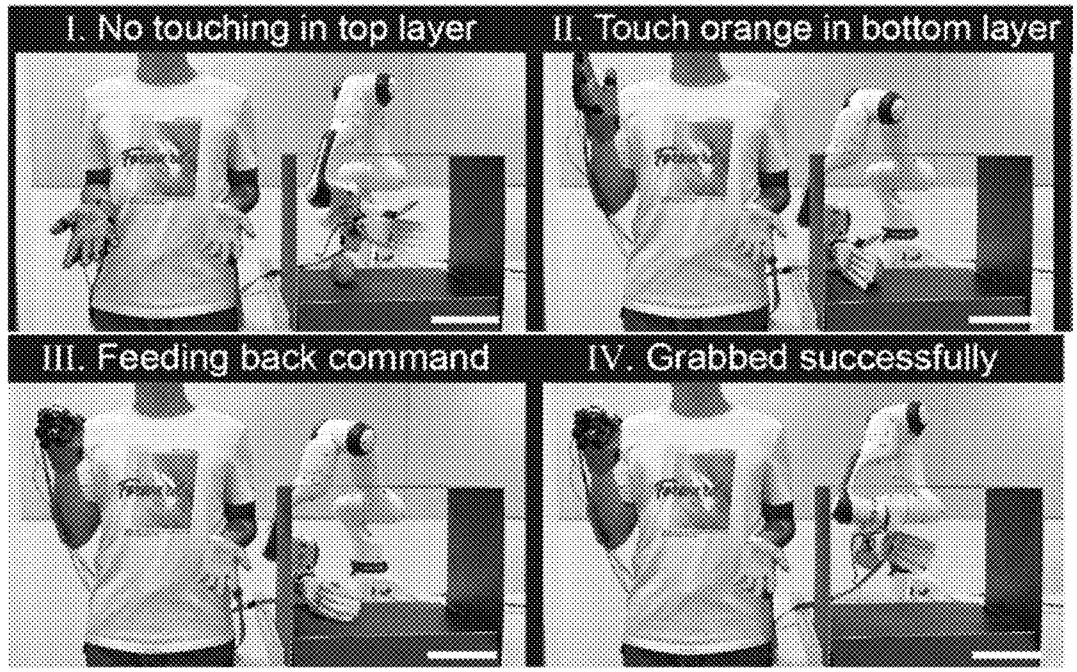

FIG. 18B and FIG. 18C respectively portray the application demonstrations of the passive tactile feedback system in a black box setting. Referring to FIG. 18B, initially, the robotic arm scans for elevated items within the box (image I in FIG. 18B), touching a high cup (image II in FIG. 18B) triggers electric stimuli on the subject's arm, informing them of the object's contact. The subject then raises his hand to signal object perception (image III in FIG. 18B) and issues the grasp command (image IV in FIG. 18B), completing the perceptual-feedback cycle. Referring to FIG. 18C, the robotic arm scans the upper layer, finding no objects (image I in FIG. 18C), before probing the lower layer, encountering an orange (image II in FIG. 18C), prompting arm stimulation and signaling object perception (image III in FIG. 18C), culminating in the command to grasp the object (image IV in FIG. 18C), concluding the perception-feedback sequence.

Figure 19A:
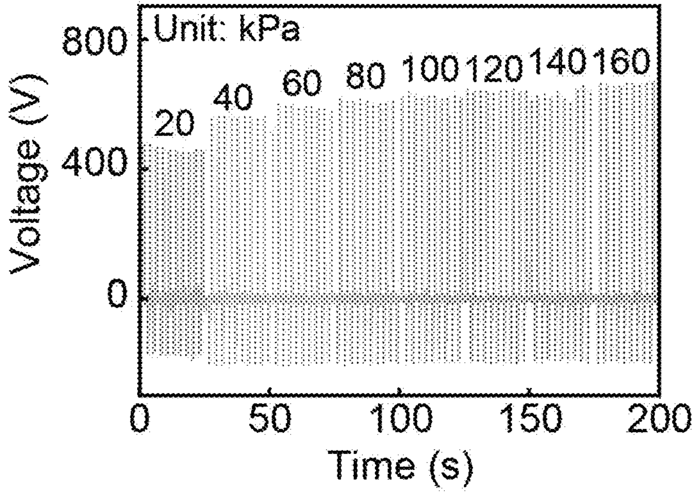
FIGS. 19A and 19B show voltage and charge curves of the TENG unit of SPETH glove during under different pressure, where the size of TENG is 1.5 cm×1.5 cm.
Figure 19B:
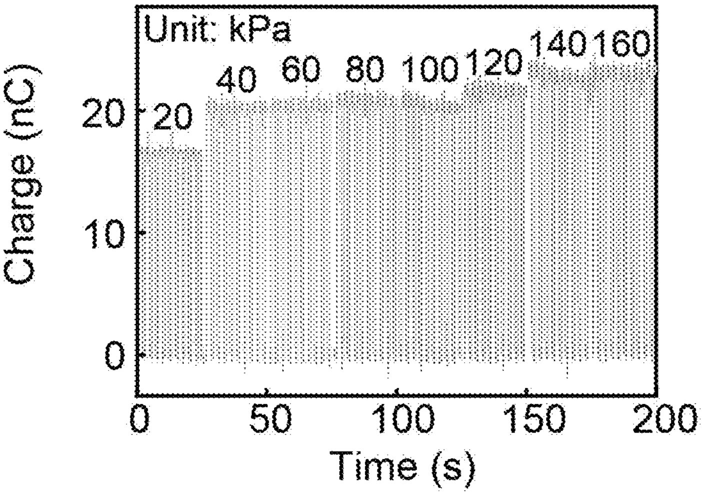

To evaluate the output performance of triboelectric unit of SPETH glove, experiments were conducted using a square and same-designed TENG with a size of 1.5 cm×1.5 cm. It is evident from the data presented in FIG. 19A and FIG. 19B that both the voltage and charge increase with pressure. However, as the pressure increases, the growth rate will decrease and eventually become saturated. Ultimately, under a pressure of 40 N, there could be approximately 600 V of voltage output and 20 nC of charge output.

Figure 19C:
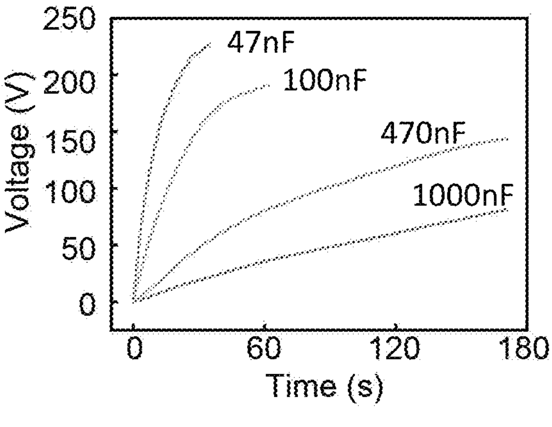
FIG. 19C shows voltage-time curve of charging different capacitors using the TENG unit.

As shown in FIG. 19C, the charging curves of TENG for various capacitors are displayed, highlighting the significant output capability of SPETH glove. It only takes approximately 60 seconds to charge a 100 nF capacitor to 200 V, and for smaller capacities, the charging time is even shorter.

GDTs are intricate devices with custom configurations and controlled inert gas volumes, designed to promote breakdown at significantly reduced voltage thresholds. The use of GDT by the present invention can solve the problem of traditional TENGs in generating voltages exceeding several thousand volts, which can easily lead to breakdown discharge.

Figure 19D:
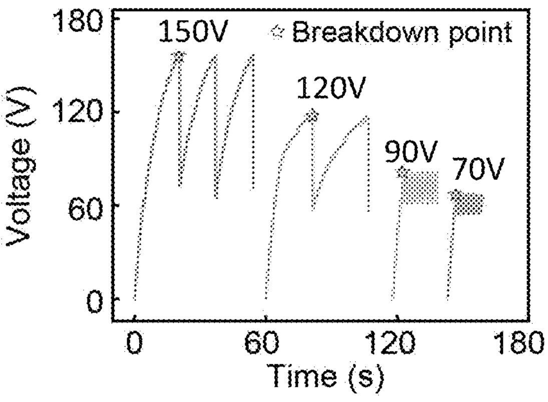
FIG. 19D shows voltage-time curve of GDT under different voltage breakdown threshold.

Therefore, wearable devices based on the present invention can facilitate the generation of pulse currents at lower voltages for optimal functionality. FIG. 19D shows voltage-time curve of GDT under different voltage breakdown threshold, where gas breakdown sites are highlighted with stars. When the GDT reaches its breakdown voltage ($V_b$), it breaks down and opens a channel, facilitating current conduction. As the voltage across the capacitor gradually decreases, it eventually reaches the extinction voltage ($V_e$), triggering the closure of the GDT channel and halting current flow. Subsequent recharging of the capacitor occurs until the next breakdown event.

Figure 19E:
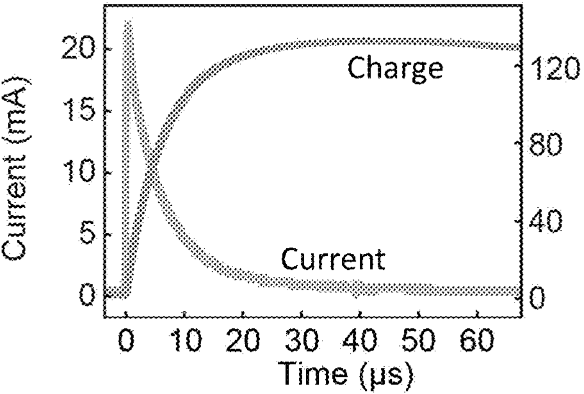
FIG. 19E shows current and charge curves during skin discharge.

Notably, the initial charging process starts from zero voltage and takes longer, whereas subsequent recharges do not commence from a fully discharged state. Consequently, storage capacitors can achieve breakdown threshold voltage much faster, significantly enhancing process efficiency. For instance, FIG. 19E, current and charge curves during skin discharge with a GDT are illustrated. The experimental setup featured a GDT with a breakdown voltage of 120 V and a 10 nF rated storage capacitor. However, only 120 nC of charge was dispensed, considerably lower than the total 1200 nC storage capacity of the capacitor. This discrepancy occurs because the stored charge in the capacitor is not entirely released during discharge, thereby reducing the threshold for subsequent electrical breakdowns, facilitating GDT re-triggering.

Figure 19F:
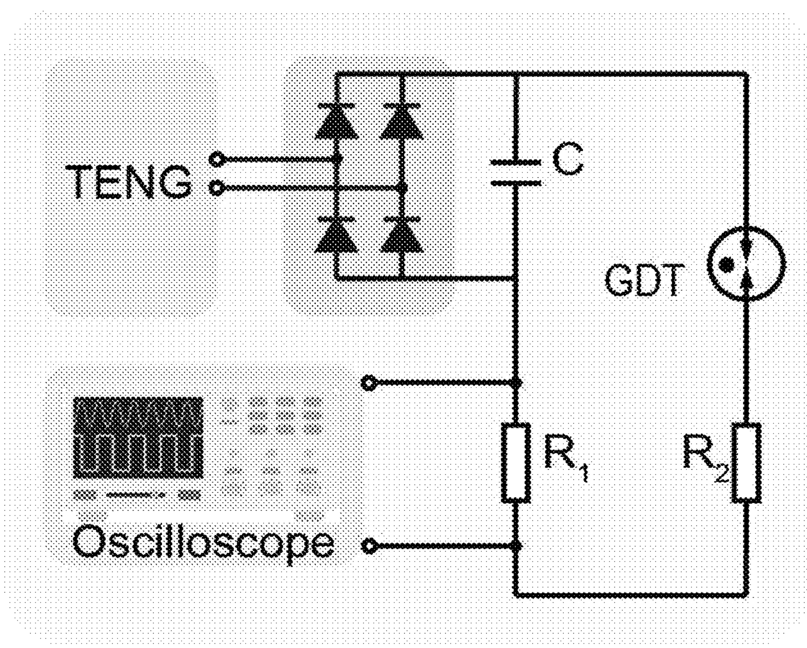
FIG. 19F shows schematic diagram of current testing for GDT discharge.

To assess the discharge performance of GDT, a circuit diagram of inducing breakdown discharge in GDT using TENG is presented in FIG. 19F. In this circuit, the alternating current generated by the TENG is rectified into direct current, subsequently stored in capacitor C. The setup involves serial connection of the GDT and resistor $R_2$, followed by parallel connection with the capacitor. Here, $R_2$ represents skin resistance, while $R_1$, with an approximately 3.9 kΩ resistance, is significantly lower than the oscilloscope's internal resistance of 100 MΩ, functioning as a minor resistor for monitoring the discharge current. Upon reaching the breakdown threshold voltage across the GDT, the discharge current flows through $R_2$ and $R_1$, effectively stimulating the skin.

Figure 19G:
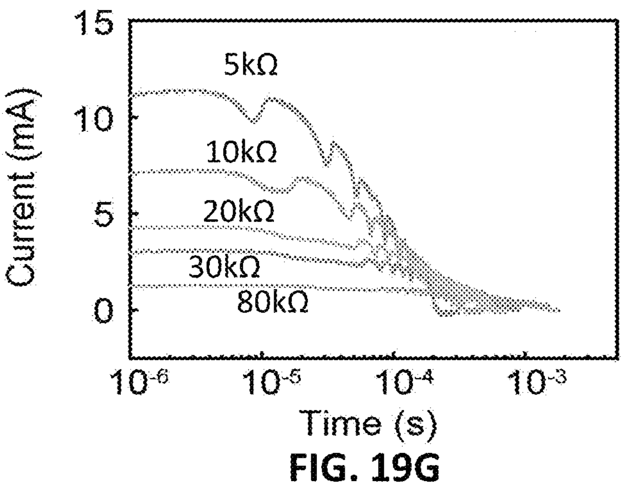
FIGS. 19G, 19H and 19I show current curves of different GDTs under different resistances, capacitances and discharge thresholds respectively.
Figure 19H:
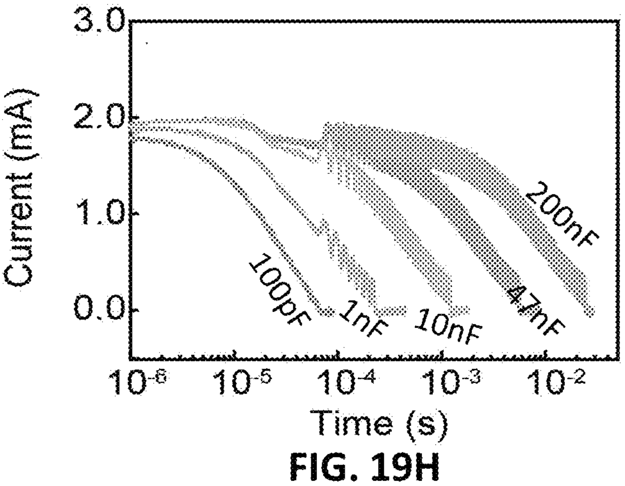
Figure 19I:
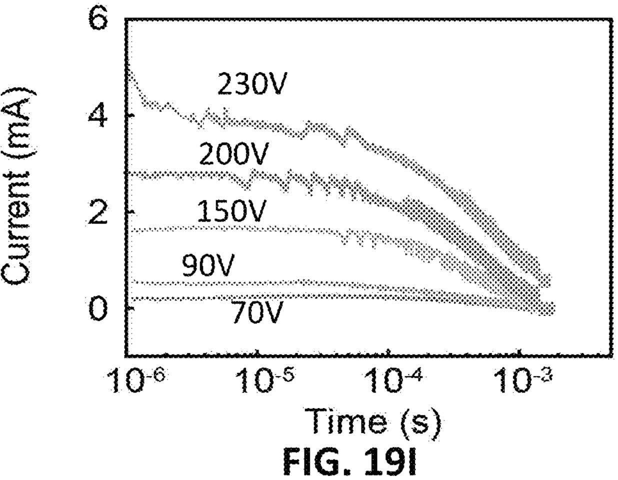

Throughout the system, the size of capacitor C, skin's equivalent impedance, and the threshold of the gas discharge tube significantly influence the actual current. Based on this circuit, the major influential factors, including skin impedance, capacitance, and discharge threshold were studied, as shown in FIGS. 19G to 19H. Among them, FIG. 19G illustrates the impact of equivalent skin impedance under a fixed capacitance of 10 nF and a breakdown voltage of 150 V. The impact of capacitance C is explored in FIG. 19H with a constant resistance of 50 kΩ and a breakdown voltage of 150 V. FIG. 19I explores the effect of breakdown voltage with a fixed capacitance of 47 nF and resistance of 50 kΩ. The observed trend in the data aligns with Ohm's Law, showing that a decrease in skin impedance leads to an increase in discharge current. The duration of the discharge current is directly influenced by capacitance, and raising the breakdown threshold typically results in higher discharge currents under static conditions.

Figures 20A, 20B, 20C:
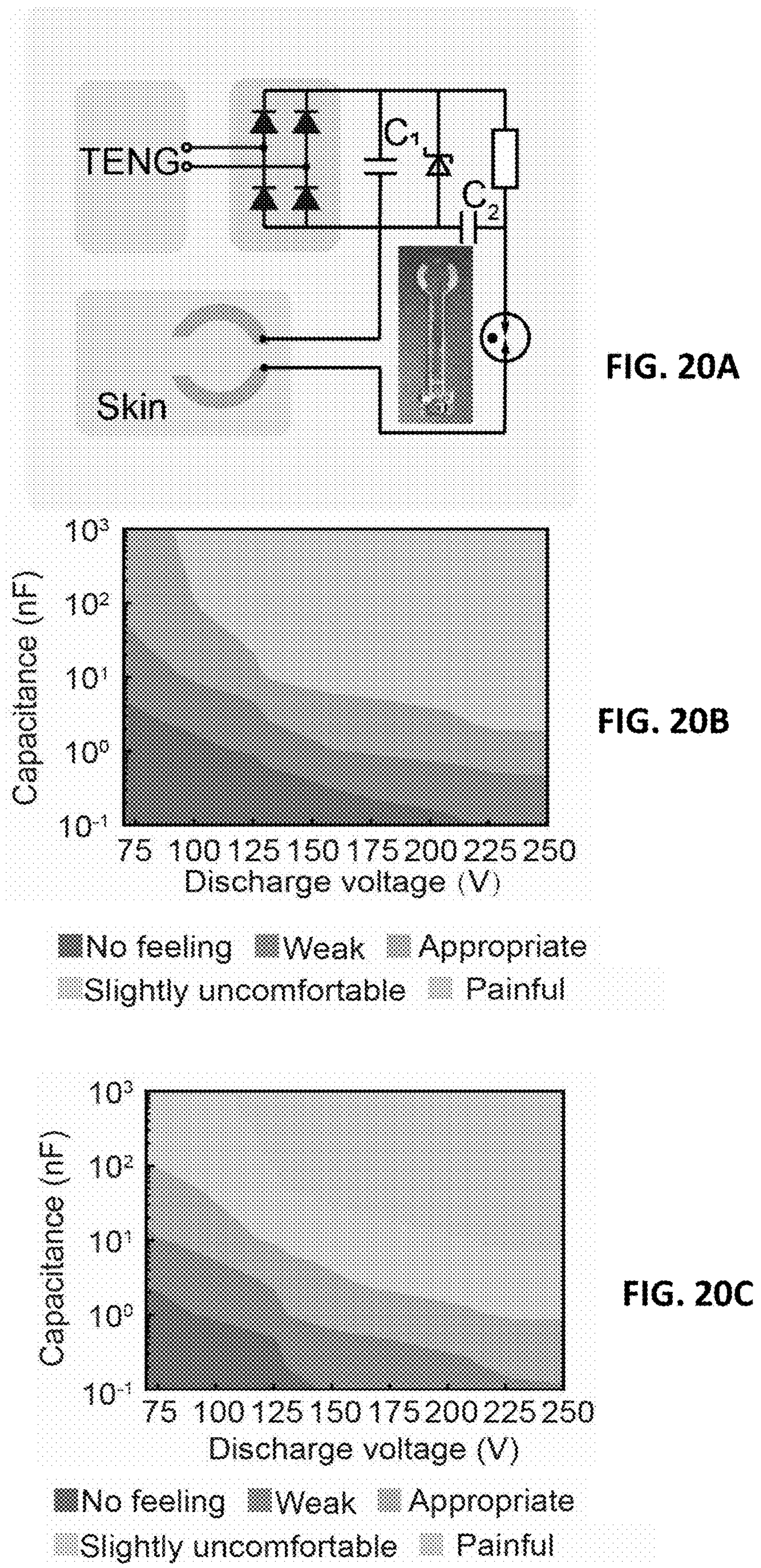
FIG. 20A shows a schematic diagram of tactile feedback testing.
FIGS. 20B and 20C illustrate a grading chart of sensations for male and female subjects at different capacitance and discharge thresholds voltage.

To evaluate the influence of various circuit design parameters on tactile perception, a haptic testing system integrated with human skin, as shown in FIG. 20A, is set up. In this testing system, the current generated by the TENG is rectified into direct current and stored in capacitor $C_1$. A Zener diode was connected in parallel with $C_1$ to prevent excess voltage accumulation. Subsequently, capacitor $C_2$ is series-connected with a 100 kΩ resistor, then paralleled with $C_1$ to enable continuous charging of $C_2$ from $C_1$. At the end of the circuit, $C_2$ is connected to both the skin and a GDT. Upon reaching the breakdown voltage threshold of the GDT, the current traveled through the GDT to the skin, generating perceptible haptic feedback.

Key factors influencing haptic perception intensity in this testing system included the capacitance of $C_2$, the GDT's breakdown threshold, and the size and placement of electrodes on the skin. A pilot test involving 20 subjects (10 males and 10 females) is conducted to analyze how variations in capacitance and breakdown thresholds influenced electro-tactile sensations on human arms. The testing results are depicted in FIG. 20B for males and FIG. 20C for females. Sensations were classified into five categories: no feeling, weak, comfortable, slightly uncomfortable, and uncomfortable. Subjects, blinded to experimental conditions, selected a category that best reflected their experiences. The data shows that increasing capacitance or breakdown threshold notably improves tactile sensation.

Figure 20D:
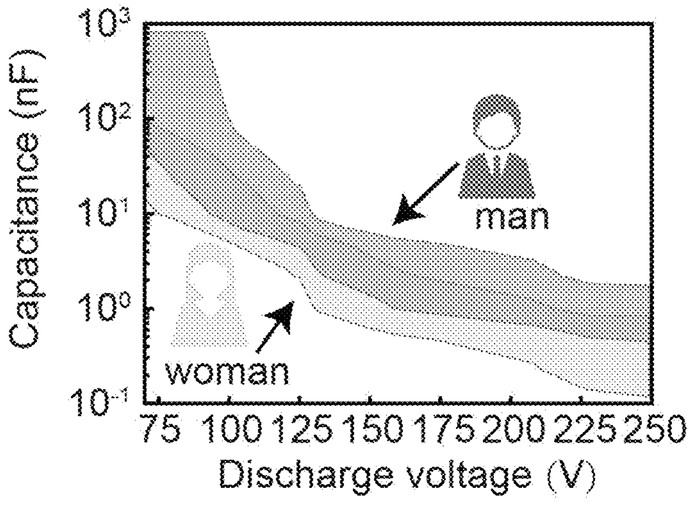
FIG. 20D shows a comparison graph of comfort zones for male and female subjects.

Moreover, FIG. 20D presents data demonstrating gender-based differences in the perception of comfort, showing that required capacitance for females significantly reduced from between 20 nF and 100 nF to less than 1 nF when the breakdown voltage was increased from 70 V to 250 V. For males, capacitance decreased from above 40 nF to a range of 1 nF to 4 nF under comparable conditions, likely due to physiological differences such as skin resistance and dermal thickness.

Figure 20E:
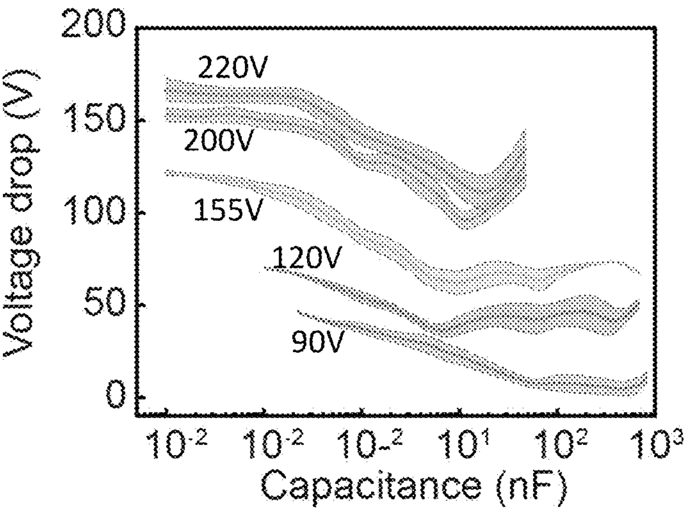
FIG. 20E shows a voltage drop curve of GDT at different discharge thresholds and capacitance.

FIG. 20E demonstrates the actual voltage drop ($V_{drop}$), denoting in Eq.1, under varying capacitances and breakdown thresholds:

$$V_{drop} = V_b - V_e \tag{1}$$

It shows that increasing capacitance leads to a gradual decrease in the voltage drop, suggesting that the actual charge passed does not increase linearly with capacitance under fixed breakdown thresholds. Hence, a high capacitance paired with a low breakdown threshold provides only a mild tactile sensation due to minimal charge transmission through the skin. Further analyses focused on how single discharge energy influenced tactile perception. The transmitted energy passed through the skin W can be approximated as Eq.2:

$$W = \frac{1}{2}C\left(V_b^2 - V_e^2\right) \tag{2}$$

Figure 20F:
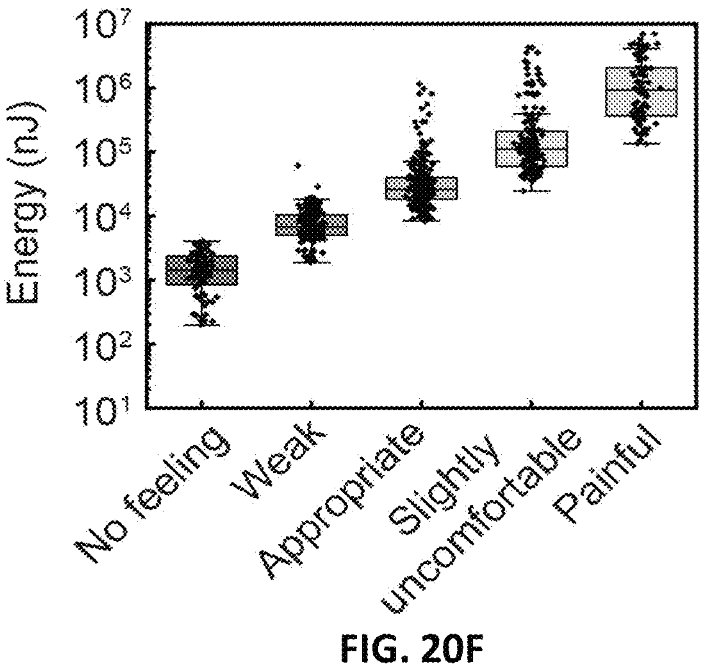
FIGS. 20F and 20G illustrate boxplots of electric stimulation energy received on the skin for male and female subjects respectively at different sensation levels.
Figure 20G:
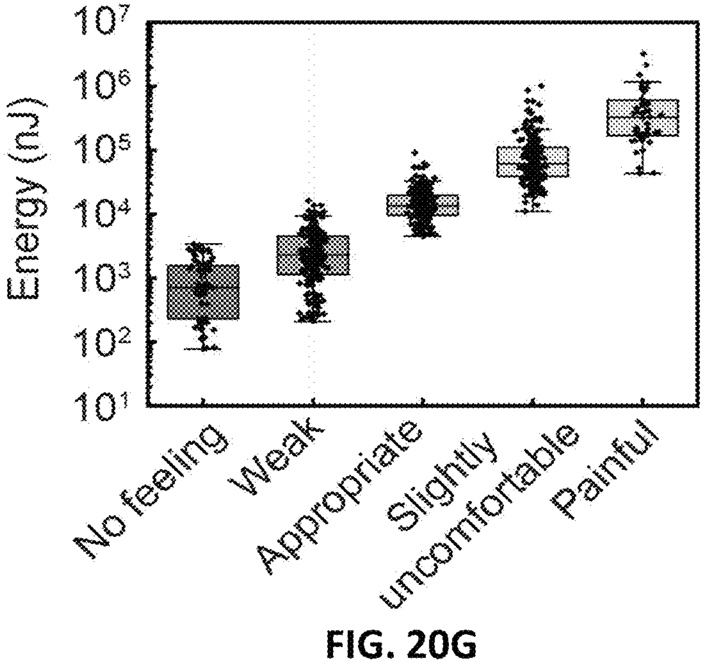

Subsequently, calculations were conducted to assess the energy injected to skins of male and female subjects within the graded zones depicted in FIG. 20F and FIG. 20G. The results in FIGS. 20F and 20G show that the energy range extends over three orders of magnitude, from $10^3$ to $10^6$ nanojoules, transitioning from no feeling to uncomfortable. Within this range, males typically require approximately 30 microjoules of energy to elicit a moderate sensation, whereas females often only need about 10 microjoules.

Furthermore, in terms of sensitivity to uncomfortable, males generally experience discomfort when a single discharge delivers more than 1000 microjoules to the skin. In contrast, females may feel discomfort at discharge energies as low as 500 microjoules. This suggests significant variability in sensory thresholds, both between genders and among individuals.

Figure 20H:
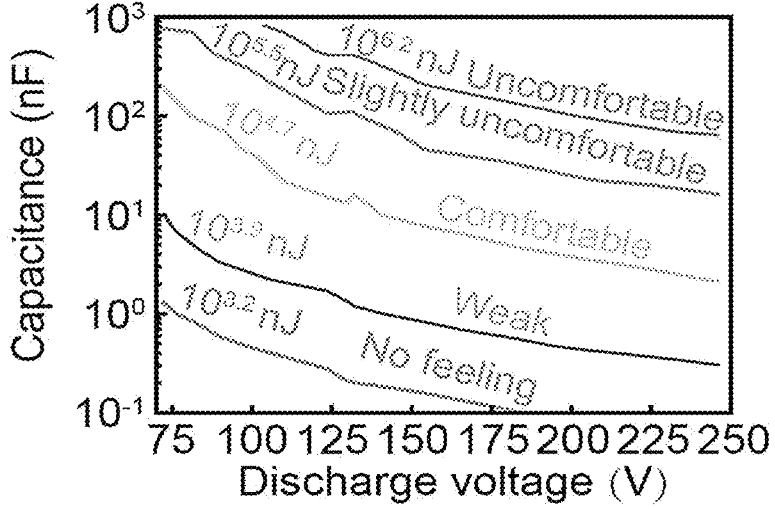
FIGS. 20H and 20I illustrate distribution graphs of electric stimulation energy for male and female subjects at different sensations. The electric stimulation energy is defined by the average values of FIGS. 20F and 20G.
Figure 20I:
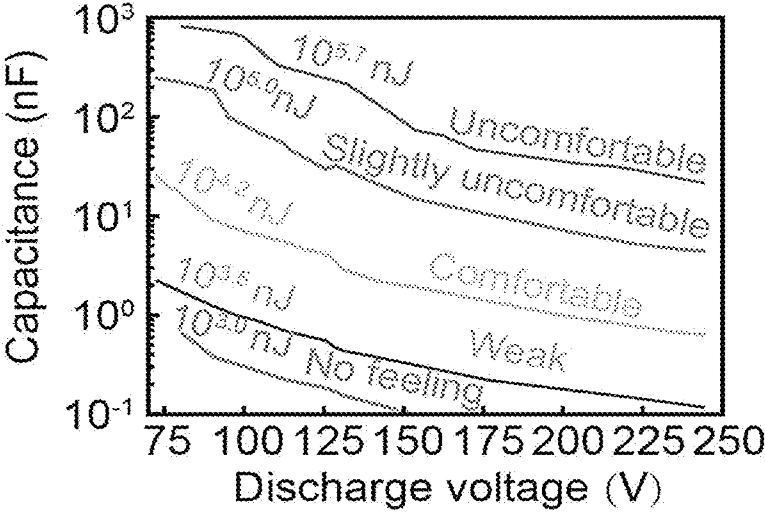

Furthermore, the contour maps in FIG. 20H and FIG. 20I, respectively derived from the medians of FIG. 20F and FIG. 20G, correspond with the distribution of sensation levels, emphasizing that the vigor of tactile stimulation is predominantly contingent upon the magnitude of energy input. It is noteworthy that within this framework, the energy requisite for an individual tactile perception typically operates at the microjoule level, feasibly achieved through single cycle output of TENG, thereby ensuring the system's sustained functionality.

Figure 21A:
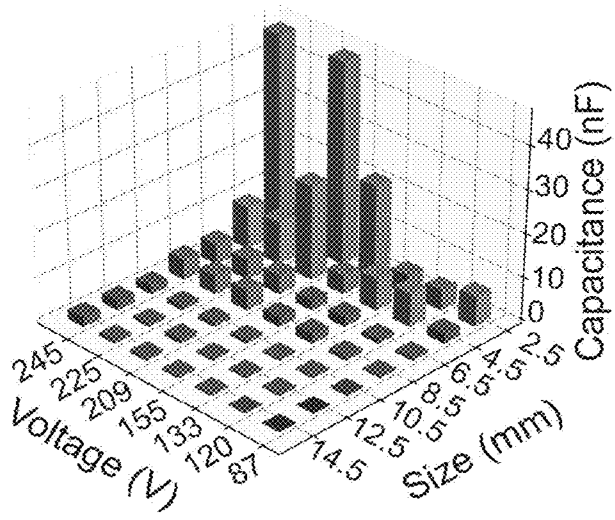
FIG. 21A shows comparison of voltage and capacitance for minimal tactile perception with electrodes of different sizes.

Aside from the parameters of the management circuit, the size of the electrode, which contacts human skin, also plays a crucial role in determining the intensity of the perceived stimulation. To investigate this influential factor, FIG. 21A illustrates the minimum capacitance required to elicit a faint tactile sensation across various electrode spacings and breakthrough voltage levels.

Wider electrode spacings, which usually lead to higher skin impedance, tend to diminish the tactile response. For this reason, the present invention adopts the smallest possible electrode spacing to maximize stimulation effectiveness.

Moreover, combined effects of age and electrode position on sensation were examined to study stimulation sensitivity variance with the age of the subjects. For the study targeting comfort thresholds across different age groups, three males and three females from each age bracket (20-30, 30-35, and over 35) were recruited.

Figure 21B:
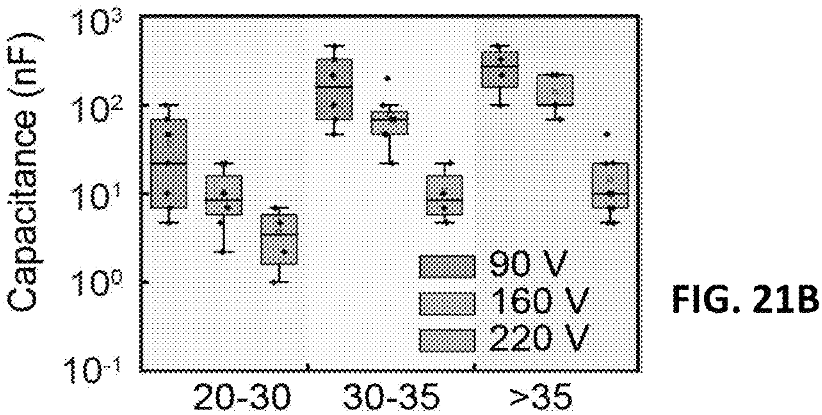
FIG. 21B shows comparison of comfortable threshold at the center of the arm for males in different age groups
Figure 21C:
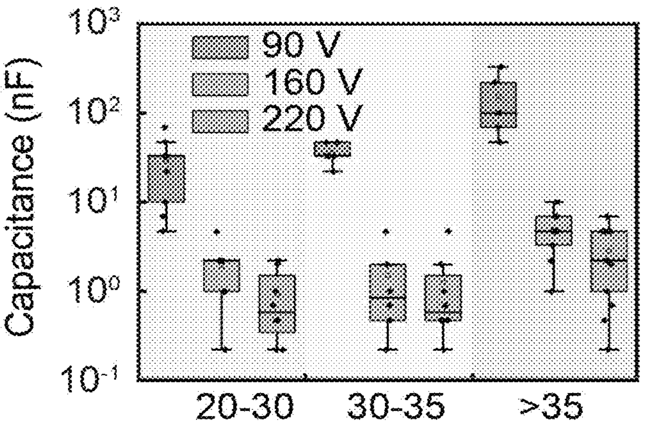
FIG. 21C shows comparison of comfortable threshold at the center of the arm for females in different age groups.

By adjusting the breakdown threshold voltage of GDT, capacitance $C_2$ required to achieve a comfortable sensation among different age groups is evaluated, as shown in FIG. 21B and FIG. 21C. From the results, it can be seen that the younger group has a more pronounced tactile sensation to the electrical stimulation of GDT, and they can achieve a comfortable level with less energy release. This trend may be attributed to an increase in skin impedance with age.

Figure 21D:
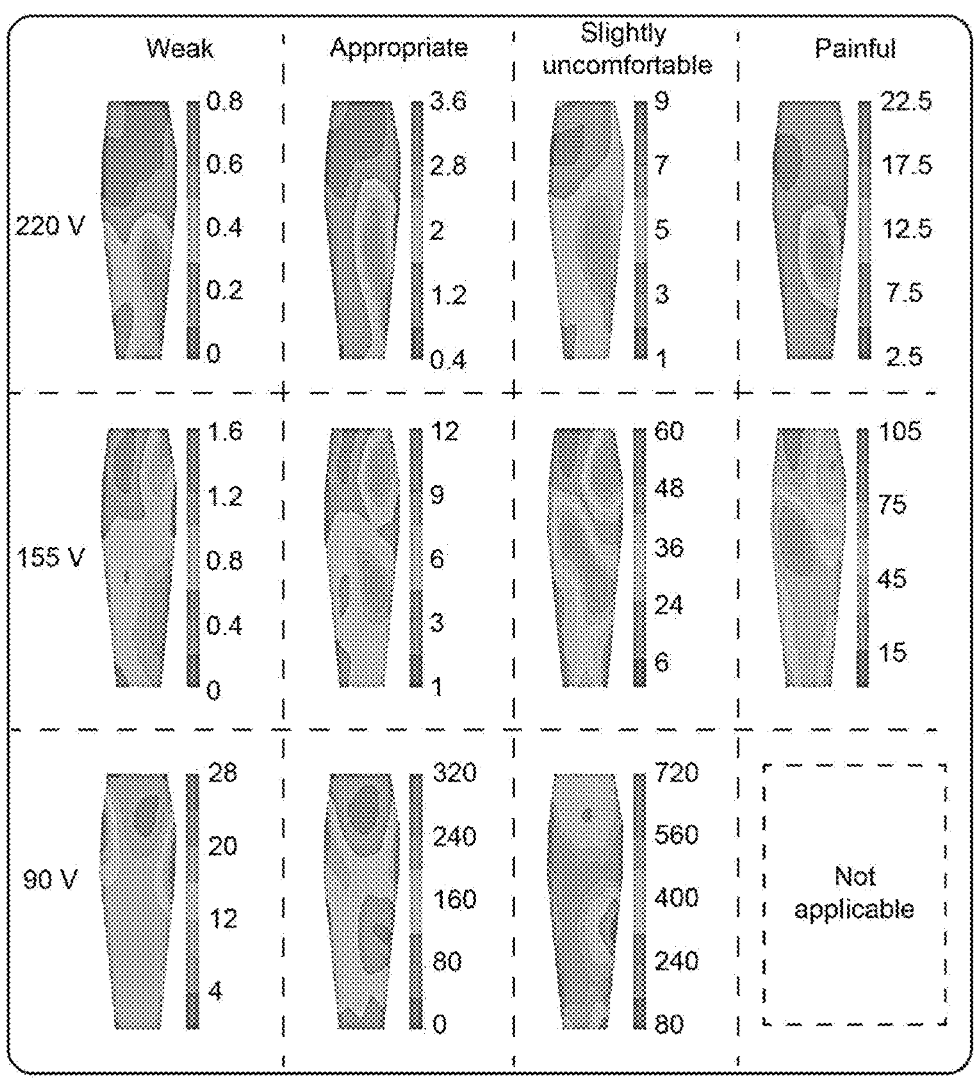
FIG. 21D shows heatmaps displaying the graded sensation across the entire arm under different voltages.
Figure 21E:
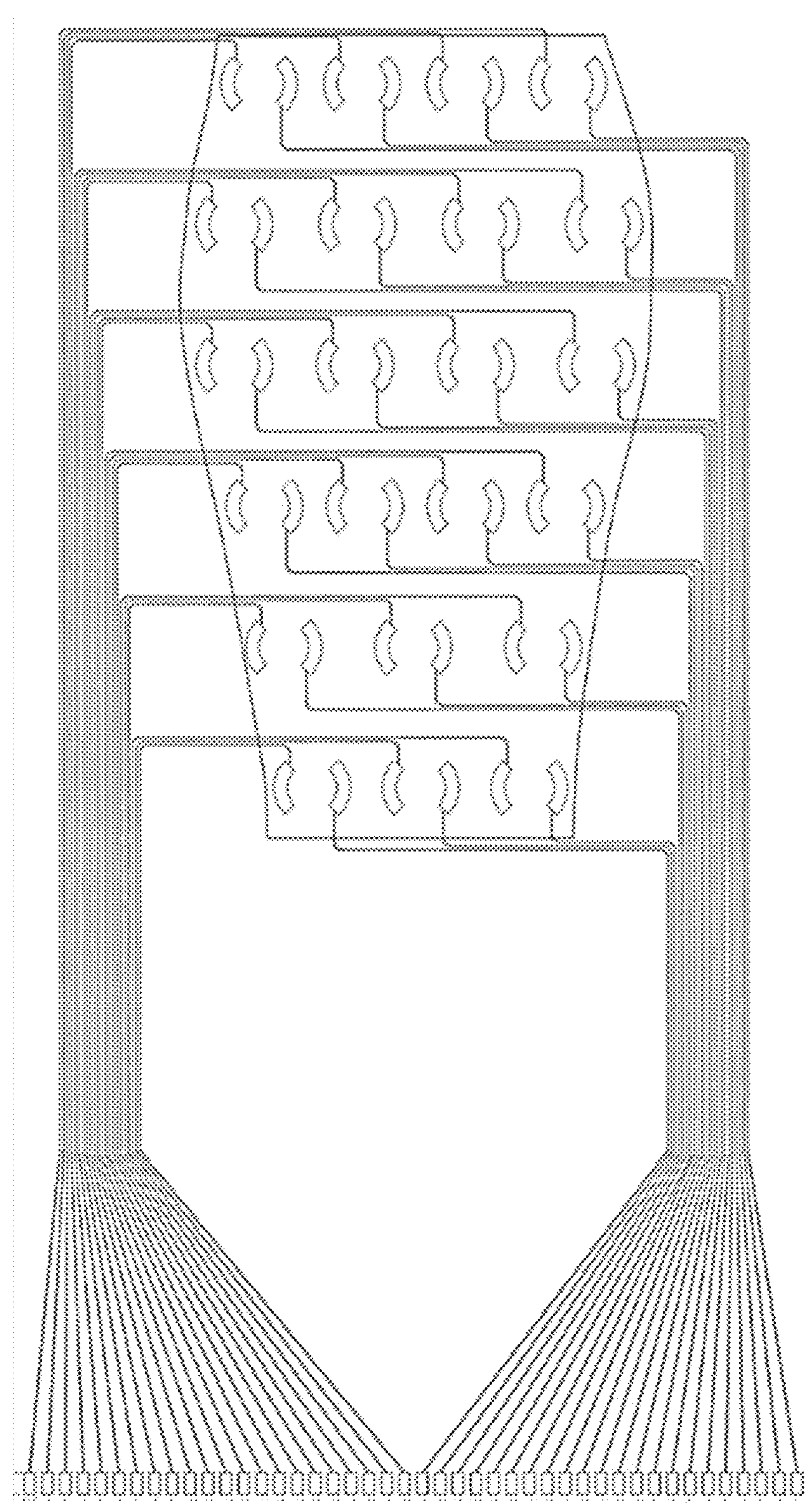
FIG. 21E shows the circuit board for sensation mapping detection.

Lastly, the influence of electrode position was also studied, where FIG. 21D presents a sensitivity map of all stimulation sites on the subject's arm. To explore tactile perception along the entire arm, 22 specific locations were identified and marked to map graded sensations comprehensively. As shown in FIG. 21E, the circuit board for sensation mapping detection is designed such that the 22 electrode points were strategically placed across the entire arm.

By controlling the breakdown voltage of the GDT and adjusting the value of storage capacitors, the tactile sensation of different electrode position in the same arm was investigated, where different feeling was sensed in different position under a same releasing energy. In detail, the threshold values for all 22 points were acquired from each volunteer and used to generate distribution maps for different sensation levels and subjects via natural interpolation methods. Observing a notable increase in sensitivity along the outer side of the arm, this experiment revealed that stimulation intensity often amplifies when electrodes are positioned near blood vessels. Lastly, it was noted that at a breakdown threshold of 90 V, an increase in capacitance did not necessarily lead to intense discomfort, presumably due to the associated low voltage drop.

Throughout the experiment, subjects were instructed to thoroughly cleanse their arms and ensure relaxation before proceeding with the testing. The discharge voltage and capacitor settings of the haptic system were adjusted until volunteers experienced a defined sensation, after which the intensity was gradually increased. Subjects were intentionally kept unaware of the electrical parameters and asked to describe the intensity of their sensations subjectively, using a predetermined five-level sensory scale ranging from no feeling to uncomfortable. Testing of the device and data collection were performed with the informed consent of all subjects.

The functional units and modules in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance to the embodiments may be executed in one or more computing devices including server computers, personal computers, laptop computers, mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

While the present disclosure has been described and illustrated with reference to specific embodiments thereof, these descriptions and illustrations are not limiting. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. Modifications may be made to adapt a particular situation, material, composition of matter, method, or process to the objective and scope of the present disclosure. All such modifications are intended to be within the scope of the claims appended hereto. While the methods disclosed herein have been described with reference to particular operations performed in a particular order, it will be understood that these operations may be combined, sub-divided, or reordered to form an equivalent method without departing from the teachings of the present disclosure. Accordingly, unless specifically indicated herein, the order and grouping of the operations are not limitations.

What is claimed is:

1. A self-powered passive electro-tactile haptic glove, comprising:

a plurality of textile-based triboelectric nanogenerators configured to harvest electrostatic energy through physical contact;

a plurality of power management circuits electrically connected to the plurality of textile-based triboelectric nanogenerators respectively and configured to covert the electrostatic energy harvested by the plurality of triboelectric nanogenerators into electro-stimulation signals; and a plurality of skin stimulation electrode pairs electrically connected to the plurality of power management circuits respectively and configured to transfer the electro-stimulation signals from the plurality of power management circuits to a user's skin.

2. The self-powered passive electro-tactile haptic glove of claim 1, wherein each of the textile-based triboelectric nanogenerators has a layered structure including:

a first triboelectric electrode layer embroidered with electrically conductive wires;

a second triboelectric electrode layer embroidered with electrically conductive wires; and a dielectric film sandwiched between the first and second triboelectric electrode layers.

3. The self-powered passive electro-tactile haptic glove of claim 2, wherein the dielectric film is a fluorinated ethylene propylene (FEP) film, a polytetrafluoroethylene (PTFE) film or a polyvinylidene fluoride (PVDF) film.

4. The self-powered passive electro-tactile haptic glove of claim 2, wherein the electrically conductive wires are silver wires or copper wires.

5. The self-powered passive electro-tactile haptic glove of claim 1, wherein the power management circuit includes:

a capacitor configured to build up an electric filed to store the harvested energy; and a gas discharge tube connected to the capacitor and configured to facilitate conduction of a discharge current acting as the electro-stimulation signal when a voltage across the capacitor reaches a breakdown threshold.

6. The self-powered passive electro-tactile haptic glove of claim 1, wherein each of the textile-based triboelectric nanogenerators is further configured to output the harvested energy as an alternating current; and each of the power management circuits further includes a rectifier configured to rectify the corresponding alternating current to a direct current.

7. The self-powered passive electro-tactile haptic glove of claim 1, further comprising a skin electro-stimulation patch including a flexible print circuit board for accommodating the plurality of skin stimulation electrode pairs.

8. The self-powered passive electro-tactile haptic glove of claim 7, wherein each of the first and second skin-contact electrodes is overlayed with a hydrogel film for enhancing contact with the skin and decreasing impedance of skin.

9. The self-powered passive electro-tactile haptic glove of claim 1, each of the skin stimulation electrode pair includes:

a first skin-contact electrode connecting a first output terminal of the power management circuit to a first contact point on the skin; and a second skin-contact electrode connecting a second output terminal of the power management circuit to a second contact point on the skin.

10. The self-powered passive electro-tactile haptic glove of claim 9, wherein each of the first and second skin-contact electrode has a semi-circular shape.

* * * * *